No. 754,703. PATENTED MAR. 15, 1904.
J. G. & M. O. REHFUSS.
APPARATUS FOR HEATING CANS PREPARATORY TO THEIR BEING FLUXED AND SOLDERED.
APPLICATION FILED AUG. 2, 1902. RENEWED JAN. 4, 1904.
NO MODEL. 3 SHEETS—SHEET 1.
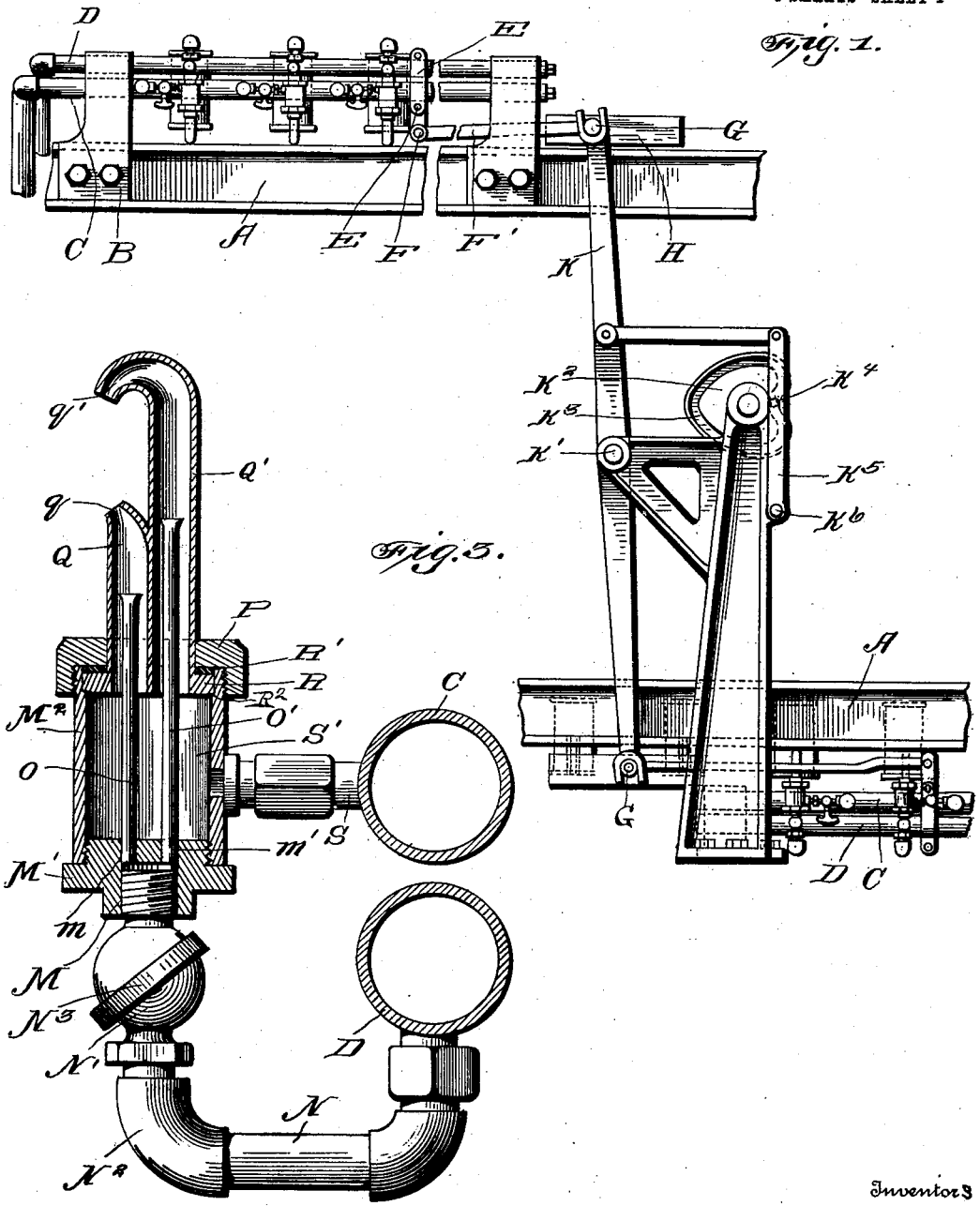

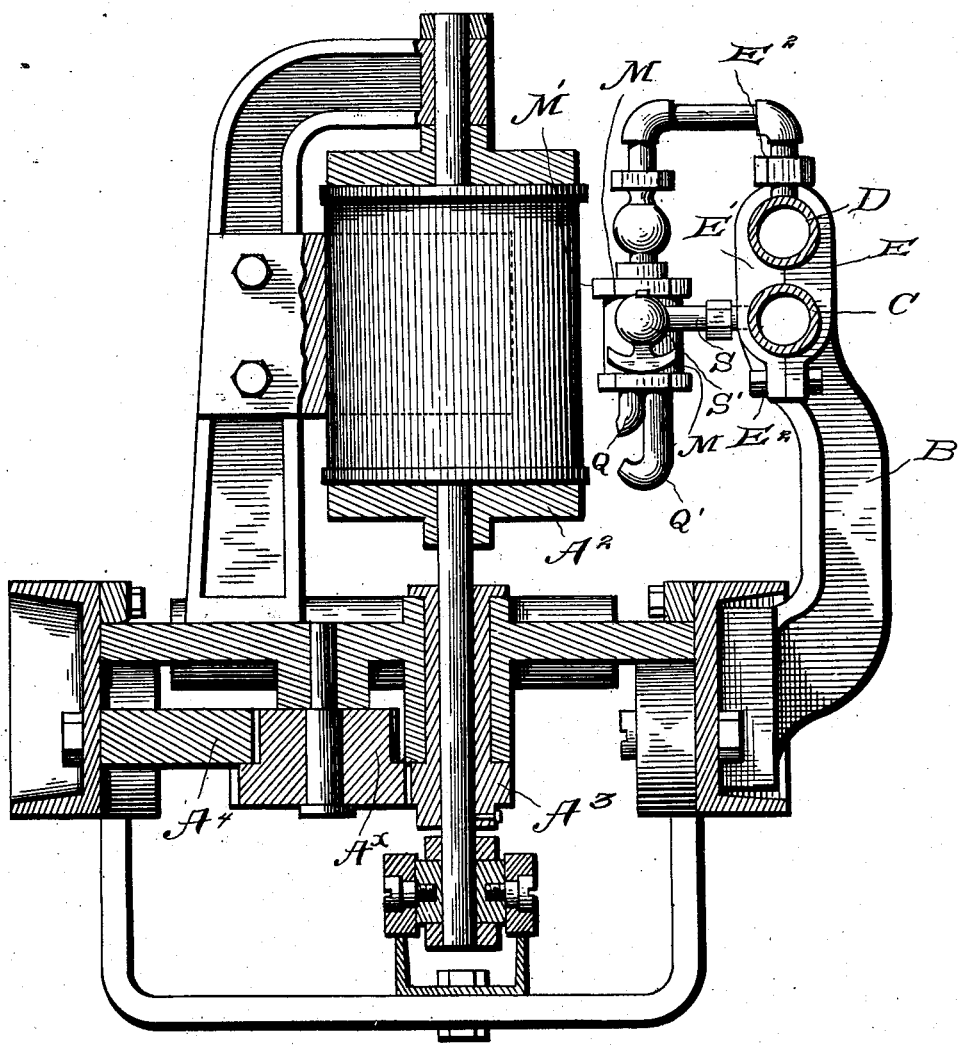

No. 754,703. PATENTED MAR. 15, 1904.
J. G. & M. O. REHFUSS.
APPARATUS FOR HEATING CANS PREPARATORY TO THEIR BEING
FLUXED AND SOLDERED.
APPLICATION FILED AUG. 2, 1902. RENEWED JAN. 4, 1904.
NO MODEL. 3 SHEETS—SHEET 3.
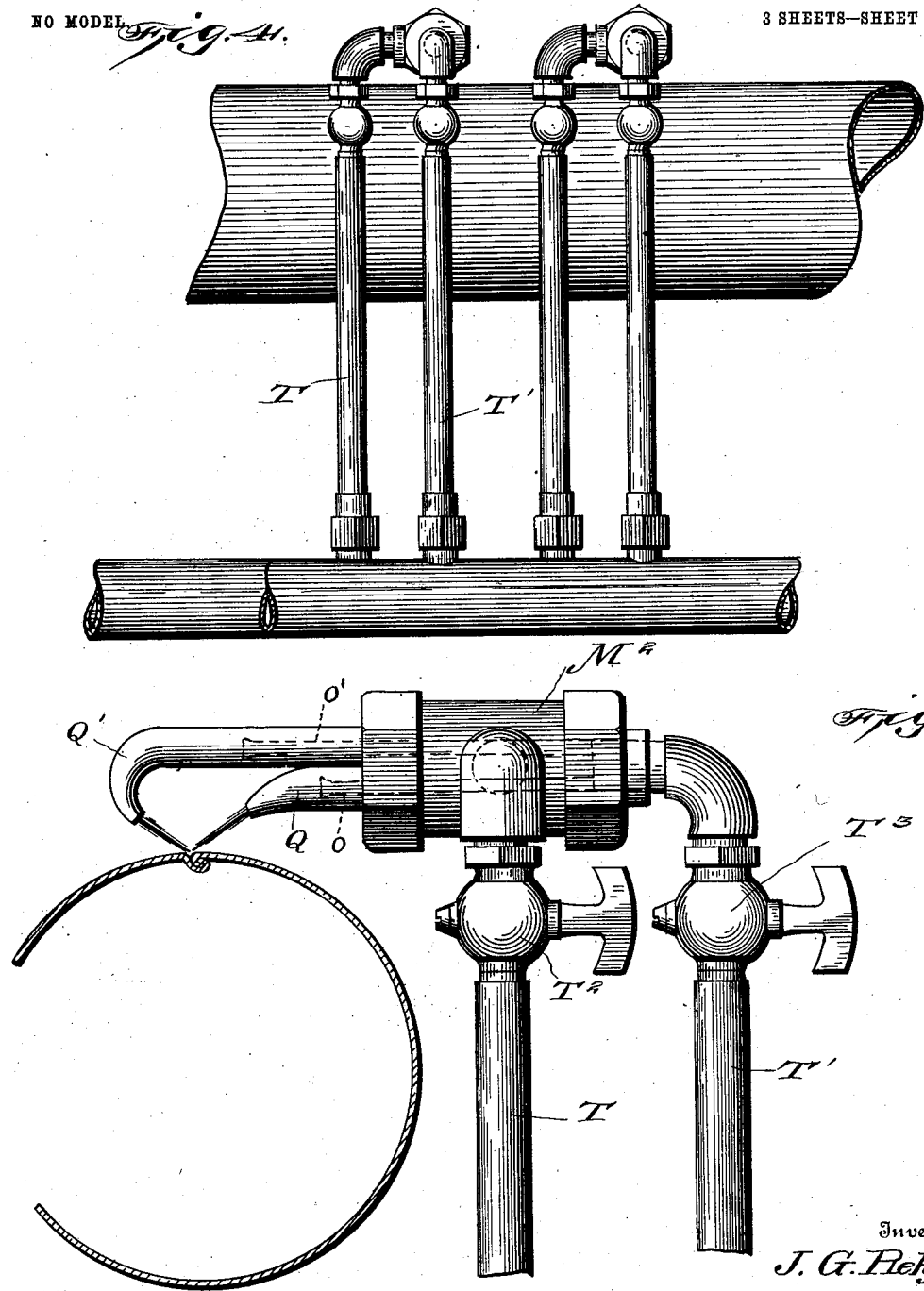

No. 754,703.

Patented March 15, 1904.

UNITED STATES PATENT OFFICE.

JOHN G. REHFUSS AND MARTIN O. REHFUSS, OF PHILADELPHIA, PENNSYLVANIA, ASSIGNORS TO THE BUREAU CAN AND MANUFACTURING COMPANY OF DELAWARE.

APPARATUS FOR HEATING CANS PREPARATORY TO THEIR BEING FLUXED AND SOLDERED.

SPECIFICATION forming part of Letters Patent No. 754,703, dated March 15, 1904.

Application filed August 2, 1902. Renewed January 4, 1904. Serial No. 187,742. (No model.)

*To all whom it may concern:*

Be it known that we, JOHN G. REHFUSS and MARTIN O. REHFUSS, citizens of the United States, residing at Philadelphia, in the county of Philadelphia and State of Pennsylvania, have invented certain new and useful Improvements in Apparatus for Heating Cans Preparatory to Their being Fluxed and Soldered; and we do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in apparatus for heating cans preparatory to their being fluxed and soldered; and it consists in the provision of directing two streams of burning gas, which have been thoroughly mixed with air, together, so that the flames will impinge against each other upon the seam to be heated either for fluxing or soldering, means being provided to heat the cans either while they are rotating or traveling with an endless carrier or heating the can as it travels longitudinally.

Our invention consists, further, in various details of construction and combinations of parts, as will be hereinafter more fully described and then specifically defined in the appended claims.

Our invention is clearly illustrated in the accompanying drawings, which, with the letters of reference marked thereon, form a part of this application, and in which drawings similar letters of reference indicate like parts in the several views, in which—

Figure 1 is a side elevation of our improved apparatus for heating cans preparatory to their being fluxed and soldered. Fig. 2 is a sectional view through the heating apparatus and parts of the endless carrier which carries and rotates the can adjacent to the burner. Fig. 3 is an enlarged sectional view through one of the burners embodying features of our invention. Fig. 4 is a side elevation of a slight modification of our heating apparatus shown as held stationary and adapted to heat a longitudinal seam of a can. Fig. 5 is a cross-sectional view of a modified form, showing the parts in elevation.

Reference now being had to the details of the drawings by letter, A A designate two parallel and horizontally-disposed portions of the frame of an endless carrier in connection with which our heating apparatus is used, said frame having mounted thereon an endless-chain carrier the links of which carry rotating cans, which cans are rotated by means of a rotating disk $A^2$, having a shank portion which passes through the link of the endless carrier and provided with a pinion-wheel $A^3$, keyed thereto, which is driven by the teeth of said pinion-wheel intermeshing with the teeth of a pinion-wheel $A^\times$, also carried by a link and adapted to mesh with a rack-bar $A^4$, horizontally disposed on the frame of the machine, said pinion-wheels being rotated only as they travel past the rack-bar.

Mounted so as to have reciprocating movements in bracket-arms B are two pipes C and D, the former of which is adapted to convey gas, while the latter conveys air to the burners which form a part of our invention.

E designates a bar forming a clamping member, which coöperates with a second bar E' to engage and move said pipes, the two clamping-bars being held together by means of suitable screws $E^2$. Mounted in the lower end of said bar E is a pin F, to which a rod F' is pivoted, which in turn has pivotal connection with a pin G, carried on a reciprocating solder-feeding carriage H. An oscillating arm K, which is connected at its bifurcated ends with pins G, is mounted on a shaft K', carried by a standard forming a part of the frame of the machine, and $K^2$ designates a cam-wheel having a heart-shaped cam-groove $K^3$ in one face thereof, in which an antifriction-wheel $K^4$, carried by a link $K^5$, pivoted at its lower end at $K^6$ to the standard, travels. A second link has pivotal connections between said link $K^5$ and the oscillating lever, whereby a reciprocating movement is imparted to the tubular portions through which the gas and air pass to the burners. By reason of the peculiar shape of the cam-groove which actuates said oscillating arm it will be noted that the latter is given a varying movement, the speed of the movement of said oscillating lever on its forward throw or the throw in the direction of the travel of the endless carrier on which the cans are mounted being equal to the speed at which the cans travel with the carrier, and on the return throw of the arm the movement being accelerated in order that the burners may be held against as many following cans as there are burners, there being three burners illustrated in the drawings; but a greater or less number may be employed, if desired.

N designates a pipe having connection through a suitable union with the air-pipe D, and N' is a valve-chamber mounted on a union $N^2$, secured on the pipe N and having a suitable valve $N^3$ in said chamber. Mounted upon the threaded contracted end of said valve-chamber is a base portion M of our improved burner, which has an annular flange M', on which the cylindrical portion $M^2$ of our burner is adapted to rest, the interior wall of said cylindrical portion being threaded and fitted over a threaded portion of said base, as illustrated clearly in the sectional view through the burner. Said base portion of the burner has two apertures $m$ and $m'$, in the former of which an open-ended tube O is mounted, and in said aperture $m$ an open-end tube O' is mounted, which tubes are of different lengths, the shorter of the two tubes adapted to pass part way through the nozzle Q, while said tube O' passes partially through the nozzle Q'. Said nozzles are mounted in an apertured plate R, which rests upon a shoulder $R^2$, formed in the inner wall of the cylindrical portion of the burner. Seated on said plate R is a washer R', and a flanged cap P is adapted to fit over said washer and hold the plate on the shoulder, while the interior threads of the flange of said cap are adapted to engage the exterior threads of the cylindrical cup and hold the various parts in place. A pipe S communicates between the chamber S', forming the interior of the cylindrical portion of the burner or the gas-chamber and the gas-supply pipe C, whereby gas is conveyed from the reciprocating gas-pipe to the gas-chamber of the burner and allowed to make exit through the nozzles Q and Q'. The exit end of the short nozzle Q has a jet $q$, through which gas which has been thoroughly mixed with the air coming from the small tube O is forced against a seam of a can, while the upper end of the nozzle Q' is slightly curved downward, as illustrated, and has a jet $q'$, which is adapted to direct the gas which has become thoroughly mixed with air in the nozzle Q' in a direction to impinge against the flame from the small jet at substantially right angles thereto, thereby directing an intense heat at the point of impingement of the two flames and against the seam being soldered.

In the modified forms of this invention we have shown the burners held stationary and mounted upon the upright gas and air pipes T and T', respectively. In this modification cup-regulating valves $T^2$ and $T^3$ are located in said pipes and lead to the cylindrical portion of the gas-chamber $M^2$. In this modification the construction of the burner is identical with that shown in the sectional view before described; but the burner is disposed at right angles to the position illustrated in said section, adapting the burner for use in connection with cans that are moving longitudinally, whereby an intense flame may be directed against the seam of a can as it travels upon a former.

The operation of our burner is as follows: In the form employed, where the burners travel with the rotating can, motion is imparted to the burners through connections between the burners and said oscillating lever, and a stream of gas which has been thoroughly mixed with air before issuing from the jets causes an intense heat by the impinging of the two flames adjacent to the seam to be heated, and as the burners travel with the cans the latter will be thoroughly heated by the time they arrive at a location in their travel where they are soldered by mechanism which forms no part of the present application. By reason of the peculiar shape of the groove in the cam-wheel the burners are actuated to advance at a speed equal to the speed of the can, but after the burners have reached their farthest forward throw the return movement is accelerated by means of the travel of the antifriction-wheel, which has connection with the oscillating lever, causing the oscillating lever and burners carried thereby to return quickly to the starting position in order to come into contact with the next set of cans and heat the same preparatory to their being fluxed and soldered, as the case may be. As there are two sets of burners which are actuated by the opposite ends of the oscillating lever for the purpose of heating the tops and bottoms preparatory to their being soldered, it will be noticed that as said oscillating lever moves upon its pivotal shaft a set of burners is actuated simultaneously in opposite directions upon the upper and lower portions of the frame adjacent to the carrier, as will be readily understood.

In the modified form the construction of our burners is identical, excepting the connections with the gas-pipes, which latter are stationary, and the burners are disposed horizontally instead of in vertical positions for the purpose of directing the impinging flame from the burner to a can which moves adjacent to and under a burner.

Having thus fully described our invention, what we claim as new, and desire to secure by Letters Patent, is—

1. An apparatus for heating cans preparatory to being fluxed and soldered, consisting in combination with the movable carrier, cans carried thereby, reciprocating tubes, through which air and gas pass, burners having communication with said tubes and adapted to direct flames from gas mixed in said burners against the moving cans, as set forth.

2. An apparatus for heating cans preparatory to being fluxed and soldered, comprising reciprocating air and gas tubes, a burner carried thereby and having communication with said tubes whereby air is mixed with gas in said tube within the burner, nozzles carried by said burner and adapted to direct impinging flames against each other and against a seam to be soldered as the burner travels with the can, as set forth.

3. An apparatus for heating cans, consisting in combination with an endless carrier, cans traveling therewith, a burner having communication with said gas-pipe, and air-tubes communicating with said air-pipe and leading into said burner, nozzles carried by the burner into which said air-pipes lead, the ends of said nozzles adapted to direct flames so as to impinge against each other at a location adjacent to a seam in the can, and means for moving the burner with the cans, as set forth.

4. An apparatus for heating cans comprising in combination with an endless carrier and cans traveling therewith, gas and air tubes, a burner having communication with said gas-pipe, nozzles carried by said burner, air-tubes leading through the burner and into said nozzles having communication with said air-tube, and adapted to direct flames which will impinge against each other adjacent to a seam of a can, and an oscillating lever, and connections between the same and said burner, and means for operating said lever, as set forth.

5. An apparatus for heating cans comprising in combination with an endless carrier and cans mounted thereon, gas and air tubes having a reciprocating movement, a burner fastened to and adapted to move with said tubes, communication between said burner and gas-tube, nozzles carried by the burner, air-tubes passing through the burner and partially through said nozzles and communicating with said air-pipe, the ends of said nozzles adapted to direct two flames to impinge against each other at a location adjacent to a seam of a can, a standard, an oscillating lever mounted on the latter, a cam-wheel, a link pivoted to said lever, an arm pivoted to said standard and connected to said link, an antifriction-wheel carried by said arm and traveling in a groove in said cam-wheel, and pivotal rod connections between said lever and burner, as set forth.

6. An apparatus for heating cans, consisting of reciprocating gas and air tubes, supports therefor, a burner carried by said tubes and having communication with said gas-tubes, nozzles carried by said burner, air-tubes passing through the burner-chamber and partially through said nozzles and communicating with said air-pipe, and means for imparting a variable movement to said burner adjacent to an endless carrier on which cans are mounted, as set forth.

7. An apparatus for heating cans comprising reciprocating gas and air tubes, means for supporting the same, a burner carried by said tubes having communication with and provided with nozzles for directing flames to impinge against each other at angles, and means for imparting a variable movement to said burner, as set forth.

8. An apparatus for heating cans comprising sets of air and gas tubes adapted to reciprocate in pairs simultaneously in opposite directions, burners mounted on said tubes and communicating therewith, nozzles on the burners adapted to direct flames so as to impinge each other adjacent to the seams of cans, said burners adapted to be reciprocated simultaneously in opposite directions with the movable tubes and adjacent to the tops and bottoms of cans adapted to be carried by an endless carrier, as set forth.

9. An apparatus for heating cans comprising a burner having a cylindrical portion, a gas and an air tube, communication between the interior of said chamber and gas-tube, open-ended air-tubes mounted in apertures in the base of said gas-chamber of the burners and having communication with an air-tube, a plate seated on a shoulder on the inner wall of said burner-chamber, nozzles carried by said plate and into which said nozzles the ends of said air-tubes extend, said nozzles being bent so as to direct flames to impinge against each other, as set forth.

10. An apparatus for heating cans for fluxing and soldering, comprising a burner, a gas-pipe having communication with the chamber of the burner, open-ended air-tubes mounted in apertures in the base of said burner and having communication with an air-pipe, a plate seated on a shoulder formed on the inner end of said gas chamber and burner, nozzles carried by said plate into which the ends of said air-tubes pass, a washer seated on said plate, and a threaded cap fitted to the wall of the chamber of the burner and adapted to hold said plate in place, said nozzles being of unequal length, the longer of which is downwardly bent, said nozzles adapted to direct two flames so as to impinge against each other at an angle, as set forth.

In testimony whereof we affix our signatures in presence of two witnesses.

JOHN G. REHFUSS,
MARTIN O. REHFUSS.

Witnesses:
HENRY PENNINGTON,
J. B. JARDELLA.